US007885848B2

(12) United States Patent
Kagan et al.

(10) Patent No.: US 7,885,848 B2
(45) Date of Patent: Feb. 8, 2011

(54) RESOURCE OPTIMIZATION SYSTEM, METHOD AND COMPUTER PROGRAM FOR BUSINESS TRANSFORMATION OUTSOURCING WITH REOPTIMIZATION ON DEMAND

(75) Inventors: Steven M. Kagan, Burr Ridge, IL (US); Philip J. Morales, Boca Raton, FL (US); John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/060,022

(22) Filed: Feb. 17, 2005

(65) Prior Publication Data

US 2006/0184412 A1    Aug. 17, 2006

(51) Int. Cl.
G06F 9/46 (2006.01)
(52) U.S. Cl. ............................................. 705/9; 705/8
(58) Field of Classification Search ................ 705/7, 705/8
See application file for complete search history.

(56) References Cited

U.S. PATENT DOCUMENTS

| | | | | |
|---|---|---|---|---|
| 5,799,286 | A * | 8/1998 | Morgan et al. ................ 705/30 |
| 5,943,652 | A * | 8/1999 | Sisley et al. .................... 705/9 |
| 6,072,493 | A * | 6/2000 | Driskell et al. ............... 715/854 |
| 6,345,239 | B1 | 2/2002 | Bowman-Amuah |
| 6,513,024 | B1 | 1/2003 | Li |
| 6,571,215 | B1 * | 5/2003 | Mahapatro ....................... 705/8 |
| 6,574,605 | B1 * | 6/2003 | Sanders et al. .................. 705/8 |
| 6,578,068 | B1 | 6/2003 | Bowman-Amuah |
| 6,684,191 | B1 * | 1/2004 | Barnard et al. .................. 705/7 |
| 6,985,872 | B2 * | 1/2006 | Benbassat et al. .............. 705/8 |
| 7,110,957 | B2 * | 9/2006 | Barnard et al. .................. 705/7 |
| 7,113,923 | B1 * | 9/2006 | Brichta et al. ................. 705/35 |
| 7,308,414 | B2 * | 12/2007 | Parker et al. .................... 705/7 |
| 7,548,872 | B2 * | 6/2009 | Keay et al. ...................... 705/8 |

(Continued)

OTHER PUBLICATIONS

Klein, Gary and Wolf, Steve. "The Role of Leverage Points in Option Generation" IEEE Transactions on Systems, Man, and Cybernetics—Part C: Applications and Reviews (Feb. 1998); vol. 28, No. 1; pp. 157-160 <http://ieeexplore.ieee.org/xpls/abs_all.jsp?arnumber=661098>.*

(Continued)

*Primary Examiner*—Romain Jeanty
*Assistant Examiner*—Gurkanwaljit Singh
(74) *Attorney, Agent, or Firm*—Scully, Scott, Murphy & Presser, P.C.; John Pivnichny

(57) ABSTRACT

Disclosed are a method, a system and a computer program for managing services of human resources. The method comprises the steps of modeling human resources delivery services from a services provider to a client company to determine outputs from inputs and constraints; and constructing an objective function representative of services resources at said services provider. The method also comprises the steps of determining optimum levels of human resources based on said modeling, said constraints, and said objective function; and allocating said human resources based upon said optimum levels. Preferably, said optimum levels of resources are determined over tiers, sites and time periods. The preferred embodiment of the invention is a system and a method for resource allocation on BTO projects. This preferred system includes an optimization model, along with its inputs and outputs. This system may be used to address dynamic client needs before and during BTO projects.

23 Claims, 2 Drawing Sheets

U.S. PATENT DOCUMENTS

| | | | |
|---|---|---|---|
| 7,596,416 B1 * | 9/2009 | Maluf et al. | 700/1 |
| 7,650,293 B2 * | 1/2010 | Kiran et al. | 705/8 |
| 7,702,533 B2 * | 4/2010 | Barnard et al. | 705/7 |
| 2002/0022982 A1 * | 2/2002 | Cooperstone et al. | 705/7 |
| 2002/0107914 A1 * | 8/2002 | Charisius et al. | 709/203 |
| 2003/0033184 A1 * | 2/2003 | Benbassat et al. | 705/8 |
| 2003/0033187 A1 * | 2/2003 | Jones et al. | 705/9 |
| 2003/0097296 A1 * | 5/2003 | Putt | 705/11 |
| 2003/0125996 A1 | 7/2003 | Bush et al. | |
| 2004/0039619 A1 * | 2/2004 | Zarb | 705/7 |
| 2004/0068431 A1 * | 4/2004 | Smith et al. | 705/10 |
| 2004/0148190 A1 * | 7/2004 | Barnard et al. | 705/1 |
| 2004/0153703 A1 * | 8/2004 | Vigue et al. | 714/4 |
| 2004/0225549 A1 * | 11/2004 | Parker et al. | 705/8 |
| 2005/0004825 A1 * | 1/2005 | Ehrler et al. | 705/8 |
| 2005/0027577 A1 * | 2/2005 | Saeed | 705/8 |
| 2005/0049911 A1 * | 3/2005 | Engelking et al. | 705/11 |
| 2005/0055256 A1 * | 3/2005 | Scott | 705/8 |
| 2005/0060224 A1 * | 3/2005 | Ricketts | 705/11 |
| 2005/0065831 A1 * | 3/2005 | Keay et al. | 705/8 |
| 2005/0108086 A1 * | 5/2005 | Kosman | 705/10 |
| 2005/0192879 A1 * | 9/2005 | Rabbat | 705/35 |
| 2005/0203784 A1 * | 9/2005 | Rackham | 705/7 |
| 2005/0240465 A1 * | 10/2005 | Kiran et al. | 705/10 |
| 2005/0278202 A1 * | 12/2005 | Broomhall et al. | 705/7 |
| 2007/0022404 A1 * | 1/2007 | Zhang et al. | 717/103 |
| 2007/0162321 A1 * | 7/2007 | Behrmann et al. | 705/9 |

OTHER PUBLICATIONS

Takeuchi, Riki (2003). How do we get there from here? Understanding the black box in strategic HRM research from resource-based and social exchange perspectives. Ph.D. dissertation, University of Maryland, College Park, United States.*

Barnett, Steve, Buchanan, Dave, Patrickson, Margaret, & Maddern, Janny. (1996). Negotiating the evolution of the HR function: Practical advice from the health care sector. Human Resource Management Journal, 6(4), 18-37.*

Roy, et al., "A Resource-Based Analysis of IT Sourcing", *The Data Base for Advances in Informatic Systems*, vol. 33, No. 2; pp. 29-40; 2002; and.

Ahituv, et al., "Top Management Toolbox for Managing Corporate IT", *Communications of the ACM*, vol. 42, No. 4; pp. 93-99; 1999.

R. Braumandl, et al., "Quality of Service in An Information Economy", *ACM Transactions on Intern Technology*, vol. 3, No. 4, Nov. 2003; pp. 291-333.

* cited by examiner

US 7,885,848 B2

RESOURCE OPTIMIZATION SYSTEM, METHOD AND COMPUTER PROGRAM FOR BUSINESS TRANSFORMATION OUTSOURCING WITH REOPTIMIZATION ON DEMAND

BACKGROUND OF THE INVENTION

1. Field of the Invention

This invention generally relates to managing services of human resources. In a preferred implementation, the invention relates to methods and systems for resource allocation on Business Transformation Outsourcing (BTO) projects.

2. Background Art

Resource optimization for Business Transformation Outsourcing (BTO) is a difficult problem for many reasons. These reasons include: human resources come from two or more organizations; those organizations often span multiple countries; sites often have different cost structures, even within the same country; and sites often have different capacities, especially when serving a distant time zone.

In addition, skill groups often have different capabilities, productivity rates, and quality levels; skill groups must align with service tiers ranging from generalist to specialist to expert; a given skill group may participate in more than one business process; and information technology affects productivity of any tier and may shift work between tiers. Other reasons why this problem is so difficult include: keeping work at its present site has particular costs and benefits, moving work from site to site has different costs and benefits, exchange rate variations change the relative costs, and timing of costs and benefits determines investment requirements.

Also, financial matters, operational matters, and business culture often impose internal constraints; logistics, regulations, and statutes often impose external constraints; and rapid and/or extensive business transformation may conflict with constraints. Further, slow and/or limited business transformation may not achieve desired results; assumptions are subject to unknown amounts of uncertainty; and as business conditions or business strategy change, the optimal solution may change.

SUMMARY OF THE INVENTION

An object of this invention is to provide a method and system for managing services of human resources.

Another object of the invention is to provide a method and system that is particularly well suited for resource allocation on Business Transformation Outsourcing (BTO) projects.

A further object of the present invention is to provide a method and system that may be used to address dynamic client needs before and during BTO projects.

These and other objectives are attained with a method, and computer system program for managing services of human resources. The method comprises the steps of modeling human resources delivery services from a services provider to a client company to determine outputs from inputs and constraints; and constructing an objective function representative of services resources at said services provider. The method also comprises the steps of determining optimum levels of human resources based on said modeling, said constraints, and said objective function; and allocating said human resources based upon said optimum levels. Preferably, said optimum levels of services are determined over tiers, sites and time periods.

The preferred embodiment of the invention is a system and a method for resource allocation on BTO projects. This preferred system includes an optimization model, along with its inputs and outputs. This system may be used to address dynamic client needs before and during BTO projects.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
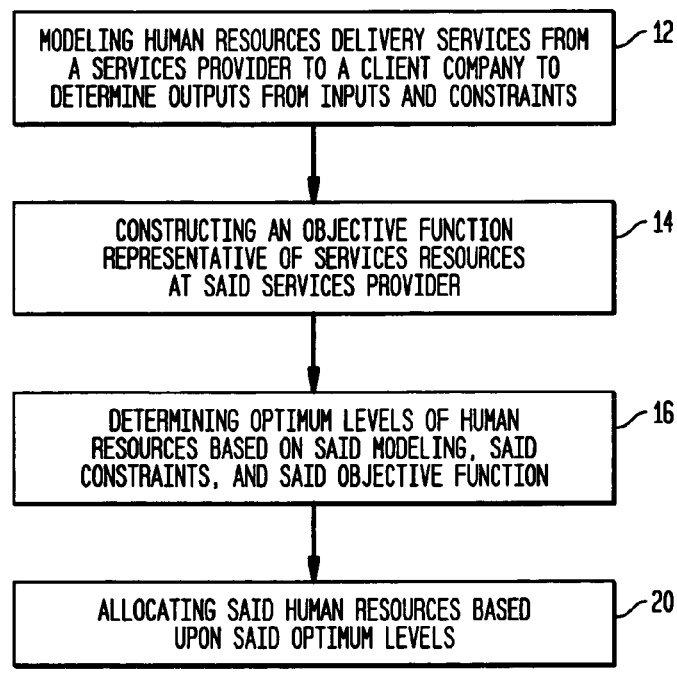
FIG. 1 is a flow chart illustrating a method that may be used to practice this invention.

The present invention, generally, relates to a method, and computer program system for managing services of human resources. With reference to FIG. 1, this method comprises the step 12 of modeling a human resources delivery services from a services provider to a client company to determine outputs from inputs and constraints; and the step 14 of constructing an objective function representative of services resources at said services provider. The method also comprises the step 16 of determining optimum levels of human resources based on said modeling, said constraints, and said objective function; and the step 20 of allocating said human resources based upon said optimum levels. Preferably, said optimum levels of services are determined over tiers, sites and time periods.

A preferred embodiment of the invention is a system and a method for resource allocation on Business Transformation Outsourcing (BTO) projects. This preferred system includes an optimization model, along with its inputs and outputs. This system may be used to address dynamic client needs before and during BTO projects.

Figure 2:
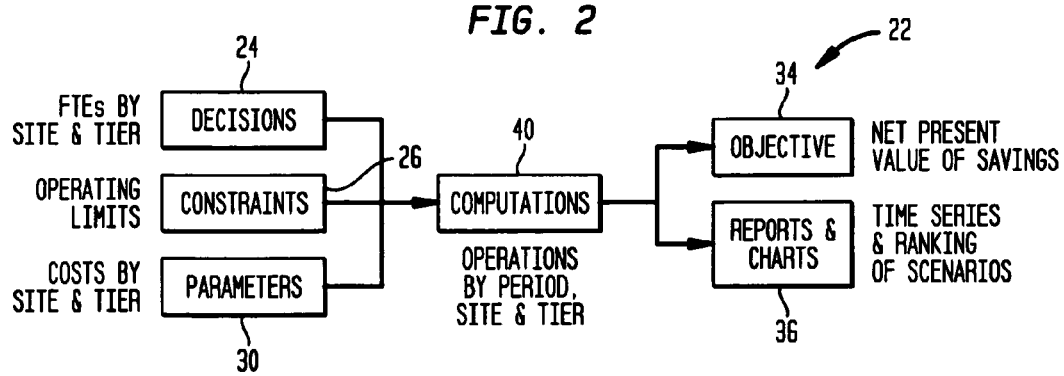
FIG. 2 shows an optimization framework that may be used in the present invention.

An optimization model is a set of formulas that can be solved in order to determine the values of decision variables that maximize (or minimize) the objective, subject to constraints. FIG. 2 shows an optimization framework 22, along with specific examples of items (identified in italics) that fit within that framework for a particular model.

The objective formula, constraints 26, and parameters 30 are input by the model. Decision variables, objective value 34, and reports and charts 36 are output from the model. Intermediate computations 40 link inputs to outputs.

Preferably, in this invention, any one of several objectives can be optimized, such as the service provider's price or the client's savings from outsourcing particular business processes. However, since costs and benefits typically do not occur evenly over the life of a BTO engagement, maximizing the net present value (NPV) of price or savings is most often the objective.

Also, in the preferred embodiment of this invention, the decisions 24 are the human resources allocated across organizations, sites, and tiers in order to maximize the objective. Those resources are typically quantified in terms of Fulltime Equivalent resources (FTEs). A fractional FTE can represent either part-time or over-time work. (Using FTEs rather than headcounts avoids integer programming.)

Sites include both the client's and the provider's locations. Service tiers typically include experts (Tier 3), specialists (Tier 2), generalists (Tier 1), and self-service (Tier 0). One common transformation is to move low-value work from higher to lower tiers through automation and training, thereby freeing experts and specialists to perform more high-value work.

Specific constraints 26 vary from client to client but typically include at least the following:
 a) Lower bound on FTEs by site and tier that the client wishes to retain as employees.
 b) Upper and lower bounds on FTEs by site and tier which the service provider will provide via employees, subcontractors, or business partners.
 c) Transition constraints that govern the timing of changes.
 d) Operating constraints that ensure the combined client-provider resources are sufficient to handle the anticipated work load with acceptable quality and timeliness.
 e) Financial constraints in the form of upper bounds on investments in human resources and information technology (IT).

Parameters 30 also vary from client to client but typically include:
 a) Number of years in the BTO engagement.
 b) Client's original FTEs by site and tier.
 c) As Is and To Be allocation of work across tiers.
 d) As Is and To Be productivity rates by site and tier.
 e) Labor cost per FTE by site and tier.
 f) Work migration costs by site and tier.
 g) Information Technology (IT) costs by site and tier.
 h) Expected attrition and retirement rates.
 i) Discount rate for net present value (NPV) computations.
 j) Currency exchange rates.
 k) Expected inflation rates by country.

Computations 40 typically include:
 a) Unit costs, adjusted for exchange rates and inflation.
 b) FTEs by period by site by tier.
 c) Movement of work between tiers.
 d) Operations by period by site by tier.
 e) Labor costs, migration costs, and IT costs per period by site.
 f) As Is versus To Be costs resulting in net savings.

Reports and charts 36 vary from client to client but typically include:
 a) Time series of resources, costs, and benefits.
 b) Ranking of sites by NPV.
 c) Comparison of alternative scenarios by relaxing constraints and/or changing parameters.

Figure 3:
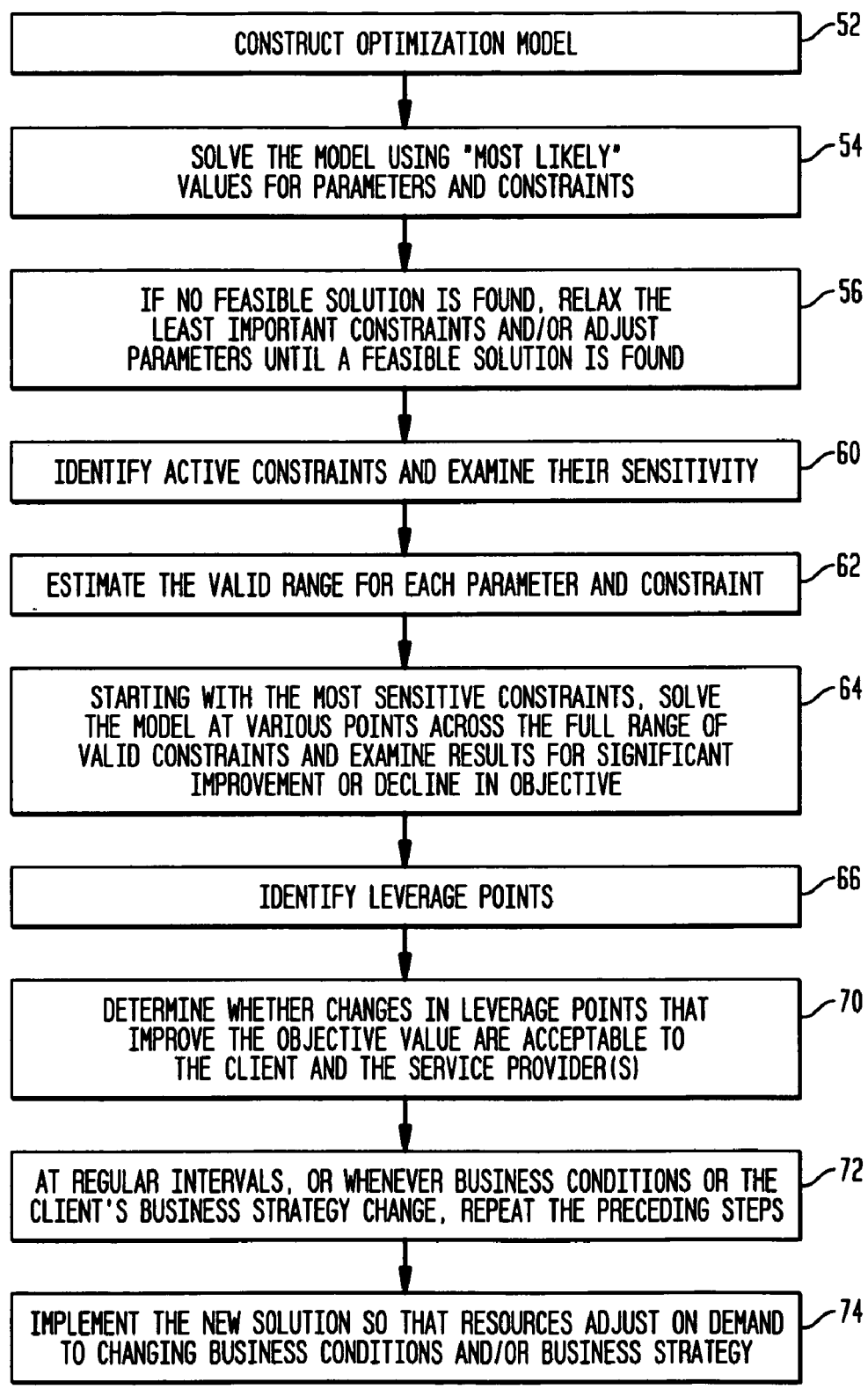
FIG. 3 is a flow chart showing a preferred method that may be used to implement the invention.

FIG. 3 shows a preferred method for carrying out this invention. In this method, step 52 is to construct an optimization model, which will generally be nonlinear, noninteger, and smooth. In a nonlinear model, a one-unit change in input does not always produce a one-unit change in output. In an integer or mixed model, all or some of the decision variables must be integers. In a nonsmooth model, a formula produces values that are discontinuous.

Step 54 is to solve the model using "most likely" values for parameters and constraints. If no feasible solution is found, then at step 56, the least important constraints are relaxed and/or parameters are adjusted until a feasible solution is found. Step 60 is to identify active constraints and to examine their sensitivity. Step 62 is to estimate the valid range for each parameter and constraint, ranging from "optimistic" to "pessimistic."

At step 64, the method, starting with the most sensitive constraints, solves the model at various points across the full range of valid constraints and examines results for significant improvement or decline in objective. Running the model according to an experimental design can be automated.

Step 66 is to identify leverage points, which are small changes in parameters and/or constraints that produce large changes in the objective. At step 70, the method determines whether changes in leverage points that improve the objective value are acceptable to the client and the service provider(s). As represented at 72, steps 52, 54, 56, 60, 62, 64, 66 and 70 are repeated at regular intervals, for instance, semiannually, or whenever business conditions or the client's business strategy changes. As represented at 74, the new solution is implemented so that resources adjust on demand to changing business conditions and/or business strategy.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A computer implemented method of allocating human resources to a client at a plurality of levels, across sites, tiers and time periods, on business transformation outsourcing projects, the method comprising the steps of:
 modeling a human resources delivery services from a services provider to a client company to determine outputs from inputs and constraints;
 constructing an objective function representative of services resources at said services provider, including the step of constructing an optimization model for optimizing one or more defined objectives, said optimization model having parameters and constraints, and being nonlinear, noninteger and smooth, said optimization model comprising a set of formulas including a number of variables, wherein said number of variables include a plurality of levels of human resources across sites, tiers, and time periods for the client;
 determining optimum levels of human resources for the client based on said modeling, said constraints, and said objective function, including the steps of:
 solving, using a computer system, the optimization model using determined values for the parameters and constraints of the optimization model, including adjusting some of the parameters and constraints of the optimization model, and estimating a valid range for each of the parameters and constraints of the optimization model, solving the optimization model at various points across the ranges of the constraints of the optimization model to produce a solution to the optimization model, including identifying a set of values for said plurality of levels of human resources wherein, when said set of values are used in the optimization model, the optimization model maximizes or minimizes a specified one of the defined objectives, identifying leverage points in said solution, said leverage points being small changes in parameters and constraints that produce large changes in said one or more defined objectives, and determining whether selected changes in the leverage points are acceptable to the client company and to the service provider according to defined criteria; and allocating said human resources based upon said optimum levels; and wherein:

said sites include both the client's and the services provider's locations; the service tiers include experts, specialists, generalists, and self-service;

the constraints of the optimization model include:

a lower bound on full time equivalent resources (FTEs) by site and tier that the client selects to retain as employees; and upper and lower bounds on FTEs by site and tier determined by the services provider; and the parameters of the optimization model include:

the clients original FTEs by site and tier; labor cost per FTE by site and tier; and work migration costs by site and tier.

2. A method according to claim 1, wherein said determining step includes the steps of:

subjecting said inputs to said constraints; and determining said optimum levels of resources over tiers, sites and periods.

3. A method according to claim 1, wherein said modeling step includes the step of, for at least one of said constraints, identifying the sensitivity of said one of said constraints.

4. A method according to claim 1, wherein said modeling step includes the step of, for at least one of said constraints, determining a valid range for said one of said constraints.

5. A method according to claim 1, comprising the further steps of:

repeating said modeling, constructing, and determining steps to identify new solutions to optimize said levels of unutilized services resources; and implementing said new solutions to adjust said levels of unutilized resources based on changing business factors.

6. A method according to claim 5, wherein said business factors include at least one of: business conditions, and business strategy.

7. A managing system for managing services of allocating human resources to a client at a plurality of levels, across sites, tiers and time periods, on business transformation outsourcing projects, the managing system comprising:

a computer memory;

one or more computer processors; and a computer executable program stored on the one or more computer readable mediums, wherein the computer executable program, when executed by the one or more computer processors performs the steps of:

modeling a human resources delivery services from a services provider to a client company to determine outputs from inputs and constraints;

constructing an objective function representative of services resources at said services provider, including constructing an optimization model for optimizing one or more defined objectives, said optimization model having parameters and constraints and being nonlinear, non-integer and smooth, said optimization model comprising a set of formulas including a number of variables, wherein said number of variables include a plurality of levels of human resources across sites, tiers, and time periods for the client;

determining optimum levels of human resources for the client based on said modeling, said constraints, and said objective function, including:

solving the optimization model using determined values for the parameters and constraints of the optimization model, including adjusting some of the parameters and constraints of the optimization model, and estimating a valid range for each of the parameters and constraints of the optimization model, solving the optimization model at various points across the ranges of the constraints of the optimization model to produce a solution to the optimization model, including identifying a set of values for said plurality of levels of human resources wherein, when said set of values are used in the optimization model, the optimization model maximizes or minimizes a specified one of the defined objectives, identifying leverage points in said solution, said leverage points being small changes in parameters and constraints that produce large changes in said one or more defined objectives, and determining whether selected changes in the leverage points are acceptable to the client company and to the service provider according to defined criteria; and allocating said human resources to the client company based upon said optimum levels; and wherein;

said sites include both the client's and the services provider's locations; the service tiers include experts, specialists, generalists, and self-service;

the constraints of the optimization model include:

a lower bound on full time equivalent resources (FTEs) by site and tier that the client selects to retain as employees; and upper and lower bounds on FTEs by site and tier determined by the services provider; and the parameters of the optimization model include:

the clients original FTEs by site and tier; labor cost per FTE by site and tier; and work migration costs by site and tier.

8. A managing system according to claim 7, wherein said determining includes:

subjecting said inputs to said constraints; and determining said optimum levels of resources over tiers, sites and periods.

9. A system managing according to claim 7, wherein said modeling includes identifying the sensitivity of at least one of said constraints.

10. A system managing according to claim 7, wherein said modeling includes determining a valid range for at least one of said constraints.

11. A managing system according to claim 7, wherein the computer system is further configured for:

repeating said modeling, constructing, and determining to identify new solutions to optimize said levels of unutilized services resources; and implementing said new solutions to adjust said levels of unutilized resources based on changing business factors, wherein:

said business factors include at least one of (i) business conditions, and (ii) business strategy.

12. A computer program storage device readable by a computer, tangibly embodying a program of instructions executable by the computer to perform method steps for allocating human resources to a client at a plurality of levels, across sites, tiers and time periods, on business transformation outsourcing projects, said method steps comprising:

modeling a human resources delivery services from a services provider to a client company to determine outputs from inputs and constraints;

constructing an objective function representative of services resources at said services provider, including the step of constructing an optimization model for optimizing one or more defined objectives, said optimization model having parameters and constraints and being nonlinear, noninteger and smooth, said optimization model comprising a set of formulas including a number of variables, wherein said number of variables include a plurality of levels of human resources across sites, tiers, and time periods for the client;

determining optimum levels of human resources based on said modeling, said constraints, and said objective function, including the steps of:

solving the optimization model using determined values for the parameters and constraints of the optimization model, including adjusting some of the parameters and constraints of the optimization model, and estimating a valid range for each of the parameters and constraints of the optimization model, solving the optimization model at various points across the ranges of the constraints of the optimization model to produce a solution to the optimization model, including identifying a set of values for said plurality of levels of human resources wherein, when said set of values are used in the optimization model, the optimization model maximizes or minimizes a specified one of the defined objectives, identifying leverage points in said solution, said leverage points being small changes in parameters and constraints that produce large changes in said one or more defined objectives, and determining whether selected changes in the leverage points are acceptable to the client company and to the service provider according to defined criteria; and allocating said human resources to the client company based upon said optimum levels; and wherein;

said sites include both the client's and the services provider's locations; the service tiers include experts, specialists, generalists, and self-service;

the constraints of the optimization model include:

a lower bound on full time equivalent resources (FTEs) by site and tier that the client selects to retain as employees; and upper and lower bounds on FTEs by site and tier determined by the services provider; and the parameters of the optimization model include:

the clients original FTEs by site and tier; labor cost per FTE by site and tier; and work migration costs by site and tier.

13. A program storage device according to claim 12, wherein said determining step includes the steps of:

subjecting said inputs to said constraints; and determining said optimum levels of resources over tiers, sites and periods.

14. A program storage device according to claim 12, wherein said modeling step includes the step of, for at least one of said constraints, identifying the sensitivity of said one of said constraints.

15. A program storage device according to claim 12, wherein said modeling step includes the step of, for at least one of said constraints, determining a valid range for said one of said constraints.

16. A program storage device according to claim 12, wherein said method steps further comprise:

repeating said modeling, constructing, and determining steps to identify new solutions to optimize said levels of unutilized services resources; and implementing said new solutions to adjust said levels of unutilized resources based on changing business factors; and wherein said business factors include at least one of (i) business conditions, and (ii) business strategy.

17. A method of deploying a computer program product for allocating human resources to a client at a plurality of levels, across sites, tiers and time periods, on business transformation outsourcing projects, the method comprising the steps of:

performing the following steps via a computer:

modeling a human resources delivery services from a services provider to a client company to determine outputs from inputs and constraints;

constructing an objective function representative of services resources at said services provider, including the step of constructing an optimization model for optimizing one or more defined objectives, said optimization model having parameters and constraints, and being nonlinear, noninteger and smooth, said optimization model comprising a set of formulas including a number of variables, wherein said number of variables include a plurality of levels of human resources across sites, tiers, and time periods for the client;

determining optimum levels of human resources for the client based on said modeling, said constraints, and said objective function, including the steps of:

solving the optimization model using determined values for the parameters and constraints of the optimization model, including adjusting some of the parameters and constraints of the optimization model, and estimating a valid range for each of the parameters and constraints of the optimization model, solving the optimization model at various points across the ranges of the constraints of the optimization model to produce a solution to the optimization model, including identifying a set of values for said plurality of levels of human resources wherein, when said set of values are used in the optimization model, the optimization model maximizes or minimizes a specified one of the defined objectives, identifying leverage points in said solution, said leverage points being small changes in parameters and constraints that produce large changes in said one or more defined objectives, and determining whether selected changes in the leverage points are acceptable to the client company and to the service provider according to defined criteria; and allocating said human resources to the client company based upon said optimum levels; and wherein;

said sites include both the client's and the services provider's locations; the service tiers include experts, specialists, generalists, and self-service;

the constraints of the optimization model include:

a lower bound on full time equivalent resources (FTEs) by site and tier that the client selects to retain as employees; and upper and lower bounds on FTEs by site and tier determined by the services provider; and the parameters of the optimization model include:

the clients original FTEs by site and tier; labor cost per FTE by site and tier; and work migration costs by site and tier.

18. A method according to claim 17, wherein said determining step includes the steps of:
subjecting said inputs to said constraints; and
determining said optimum levels of resources over tiers, sites and periods.

19. A method according to claim 17, wherein said modeling step includes the step of, for at least one of said constraints, identifying a sensitivity of said one of said constraints.

20. A method according to claim 17, wherein said modeling step includes the step of, for at least one of said constraints, determining a valid range for said one of said constraints.

21. A method according to claim 17, wherein said method steps further comprise:
repeating said modeling, constructing, and determining steps to identify new solutions to optimize said levels of unutilized services resources; and
implementing said new solutions to adjust said levels of unutilized resources based on changing business factors; and wherein
said business factors include at least one of (i) business conditions, and (ii) business strategy.

22. The method according to claim 1, wherein the solving the optimization model at various points includes using most likely values for the parameters and constraints; and if no solution is found, then adjusting one or more of the constraints and parameters until a solution is found.

23. The method according to claim 22, wherein the solving the optimization model at various points includes identifying one of the constraints of the optimization model; and starting with said most sensitive constraint identified one of the constraints, solving the optimization model, and examining results of the solving for improvement in the given objective;
the parameters of the optimization model further include currency exchange rates, and expected inflation rates by country;
a group of intermediate computations link the inputs to the outputs, and said intermediate computations include unit costs, adjusted for currency exchange rates and inflation; FTEs by period by site by tier; and movement of work between tiers; and
the specified one of the defined objectives is to maximize the client's savings from outsourcing particular business processes.

* * * * *